(12) United States Patent
Brustoloni (10) Patent No.: US 7,861,292 B2
(45) Date of Patent: *Dec. 28, 2010

(54) METHOD AND APPARATUS FOR INCREMENTALLY DEPLOYING INGRESS FILTERING ON THE INTERNET

(75) Inventor: Jose' C Brustoloni, Westfield, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 264 days.

This patent is subject to a terminal disclaimer.

(21) Appl. No.: 12/244,340

(22) Filed: Oct. 2, 2008

(65) Prior Publication Data

US 2009/0172803 A1    Jul. 2, 2009

Related U.S. Application Data

(62) Division of application No. 10/175,577, filed on Jun. 19, 2002, now Pat. No. 7,519,991.

(51) Int. Cl.
*G06F 9/00*     (2006.01)
*G06F 17/00*    (2006.01)
*H04L 9/00*     (2006.01)

(52) U.S. Cl. .................. 726/15; 726/11; 726/12; 726/13; 713/151; 713/152; 713/153; 713/154

(58) Field of Classification Search ................ 726/15
See application file for complete search history.

(56) References Cited

U.S. PATENT DOCUMENTS 6,073,175 A     6/2000  Tavs et al.

(Continued)

OTHER PUBLICATIONS

J.C. Brustoloni, "Protecting Electronic commerce from Distributed Denial-of-Service Attacks," International World Wide Web Conference, Proceedings of the Eleventh International Conference on World Wide Web, Honolulu, Hawaii, USA, (May 7, 2002), pp. 553-561.

(Continued)

*Primary Examiner*—Longbit Chai
(74) *Attorney, Agent, or Firm*—Wall & Tong, LLP (57) ABSTRACT

Ingress filtering has been adopted by the IETF as a methodology for preventing denial of service congestive attacks that spoof the source address in packets that are addressed to host server victims. Unless universally adopted by all ISPs on the Internet, however, a packet's source address cannot be totally trusted to be its actual source address. To take advantage of benefits of ingress filtering as it is gradually deployed by ISPs around the Internet, differentiated classes of service are used to transport packets whose source address can be trusted and packets whose source address cannot be trusted. A packet received by an access or edge router at an ISP that supports ingress filtering and has a source address that is properly associated with port on which it is received is forwarded in a privileged class of service and are dropped otherwise. A packet received by access or edge router at an ISP that does not support ingress filtering and whose source address cannot therefore be trusted is transported in an unprivileged class of service. At an intermediate exchange router within an intermediate ISP, where ISPs exchange packets, a packet received from an ISP that doesn't support ingress filtering is forwarded using the unprivileged class of service while a packet received from an ISP that does support ingress filtering is forwarded using the same class of service in which it is already marked.

7 Claims, 4 Drawing Sheets

U.S. PATENT DOCUMENTS

| | | | |
|---|---|---|---|
| 6,167,445 | A | 12/2000 | Gai et al. |
| 6,393,465 | B2 | 5/2002 | Leeds |
| 6,775,290 | B1 | 8/2004 | Merchant et al. |
| 2003/0115485 | A1 | 6/2003 | Milliken |

OTHER PUBLICATIONS

Kihong Park, et al., "On the Effectiveness of Route-Based Packet Filtering for Distributed DoS Attack Prevention in Power-Law Internets," Computer Communications Review, Association for Computing Machinery, New York, US, vol. 31, No. 4 (Oct. 2001), pp. 15-26.

P. Ferguson, et al., "RFC 2827: Network Ingress Filtering" Network Working Group Request for Comments, (May 2000), pp. 1-20.

European Search Report.

A. Odlyzko, "Paris Metro Pricing for the Internet," Proc. ACM Conference on Electronic Commerce (EC99), ACM, 1999, pp. 140-147.

R. Braden, et al., "Integrated Services in the Internet Architecture: An Overview," IETF, RFC 1633, Jun. 1994.

S. Blake, et al., "An Architecture for Differentiated Services," IETF, RFC 2475, Dec. 1998.

P. Ferguson, et al., "Network Ingress Filtering: Defeating Denial of Service Attacks Which EmploylP Source Address Spoofing," IETF, RFC 2827 (also BCP 0038).

S. Savage, et al., Practical Network Support for IP Traceback, Proc. SIGCOMM'2000, pp. 295-306, ACM, Stockholm, Sweden, Aug. 2000.

J. Bruno, et al., "Retrofitting quality of Service into a Time-Sharing Operating System," Proc. Annual Tech. Conf., USENIX, Jun. 1999, pp. 15-26.

"Characterizing and Tracing Packet Floods Using Cisco Routers," Cisco, available at http://www.cisco.com/warp/public/707/22.html.

RFC-2827 ("Network Ingress Filtering," May 2000).

METHOD AND APPARATUS FOR INCREMENTALLY DEPLOYING INGRESS FILTERING ON THE INTERNET

CROSS-REFERENCE TO RELATED APPLICATIONS

This application is a divisional of and commonly assigned U.S. patent application Ser. No. 10/175,577, filed on Jun. 19, 2002, now U.S. Pat. No. 7,519,991 entitled METHOD AND APPARATUS FOR INCREMENTALLY DEPLOYING INGRESS FILTERING ON THE INTERNET, which application is related to and commonly assigned United States patent applications filed simultaneously therewith on Jun. 19, 2002 entitled: "METHOD AND APPARATUS FOR PROTECTING ELECTRONIC COMMERCE FROM DISTRIBUTED DENIAL-OF-SERVICE ATTACKS", Ser. No. 10/175,463 (now U.S. Pat. No. 7,299,297), and "METHOD AND APPARATUS FOR PROTECTING WEB SITES FROM DISTRIBUTED DENIAL-OF-SERVICE ATTACKS", Ser. No. 10/175,458 (now U.S. Pat. No. 7,207,062). The foregoing applications are incorporated herein by reference in their entireties.

TECHNICAL FIELD

This invention relates to communications over the Internet, and more particularly, to protecting servers on the Internet from malicious attacks that can partially or totally disrupt service.

BACKGROUND OF THE INVENTION

In a denial-of-service (DoS) attack, a malicious client (called the attacker) performs operations designed to partially or completely prevent legitimate clients from communicating with or gaining service from a server (called the victim). DoS attacks are common and cause significant losses. Well-known sites, including Amazon, buy.com, E*Trade, eBay, Yahoo, CNN, the White House and the Pentagon are among recent victims. DoS attacks can harm sites in two ways. First, when a site cannot serve its clients, the site loses advertising and sales revenues. Second, the site's clients, advertisers, and investors are frustrated and may therefore seek competing alternatives.

Among DoS attacks, congestive ones are the most difficult to defend against. In a congestive attack, an attacker floods a server with so many packets that the server is unable to respond to requests sent by legitimate clients. Four factors make it difficult to defend against congestive attacks. First, any host connected to the Internet can be used to sustain a congestive attack against any victim also connected to the Internet. By design, the Internet will forward packets from any host to any other host on a best-effort basis, without bounding packet rate or volume. Second, there are many hosts (e.g., in homes and universities) that are connected to the Internet and do not have the benefit of proper system administration. Such hosts often contain bugs or are configured in such a way that attackers can, without authorization, use them as agents, i.e., as hosts that actually send attack packets to a victim. Agents provide cloaking and leverage to an attacker, i.e., respectively, hide the attacker's identity and multiply the attacker's resources (e.g., bandwidth). Third, attackers can spoof attack packets, i.e., falsify the packets' source addresses. Spoofing is possible because the Internet does not validate source addresses. Spoofing further enhances an attacker's cloaking. Finally, automated tools of increasing sophistication for mounting DoS attacks can be easily downloaded from the Web. Using such tools, even unskilled Web users can mount successful attacks.

The two currently most popular DoS attack techniques, smurf and TCP SYN flooding, are both congestive. In a smurf attack, the attacker sends ICMP echo requests to a network's broadcast address. The attacker spoofs the requests with the victim's address. Therefore, each host in the network sends a reply not to the attacker but to the victim, thus unwittingly becoming an agent of the attack. In a TCP SYN flooding attack, the attacker or its agents sends TCP SYN (i.e., connection request) packets to the victim, usually with a spoofed source address. Each such bogus request causes the victim to tie up resources that could be otherwise be used for requests from legitimate clients.

The origin of a congestive DoS attack that uses spoofing can be found by input logging (see, e.g., "Characterizing and Tracing Packet Floods Using Cisco Routers," Cisco, available at http://www.cisco.com/warp/public/707/22.html). To use input logging, the victim must initially determine the signature of the attack, i.e., how the attack packets differ from legitimate packets. ISP personnel then install a filter matching the attack's signature in the egress port of the router closest to the victim. The filter generates a log that indicates from what ingress port the attack is coming. Input logging is then iterated for the next upstream router, until the router closest to the origin of the attack is found. A rate-limiting filter matching the attack's signature is then installed in the ingress port from where the attacking is coming.

Input logging has several limitations. First, input logging may not be available or may prohibitively slow down routers, especially in the network core. Second, traceback using input logging may need to stop far away from the attack origins (e.g., because of administrative boundaries), where it many not be possible to distinguish malicious and legitimate packets (e.g., TCP SYN packets) that arrive in the same ingress port. Thus, input logging may be ineffective if the attack is evenly distributed among ingress ports. Finally, input logging is often a labor-intensive, tedious procedure performed under pressure and usually without adequate compensation to the ISP.

To prevent smurf attacks, the Internet Engineering Task Force (IETF) has changed the default treatment of directed broadcast packets by routers. Instead of accepting and forwarding directed broadcast packets, routers should now by default drop them. Additionally, to thwart spoofing, the IETF has recommended ingress filtering (see, e.g., P. Ferguson and D. Senie, "Network Ingress Filtering: Defeating Denial of Service Attacks Which Employ IP Source Address Spoofing," IETF, RFC 2827 (also BCP 0038), May 2000). With ingress filtering, ISP ingress routers will drop a packet that arrives in a port if the packet's source address does not match a prefix associated with the port. Ingress filtering automatically stops attacks that require spoofing. Moreover, if an attack that does not use spoofing occurs, ingress filtering allows the origin of the attack to be determined simply by examining the source addresses of attack packets. Therefore, ingress filtering can speed up recovery from such attacks. Disadvantageously, to be effective, the IETF's recommendations need to be adopted by many parties (the networks unwittingly used in smurf attacks and all ISPs) that are thereby burdened with new responsibilities and costs, but receive no compensation for solving the problem of other parties (the victims). Furthermore, if ingress filtering is not uniformly adopted across the Internet by all ISPs, the source address of a packet cannot be trusted to be the actual origin of that packet, thereby making spoofing still an effective tool for launching DoS attacks. Therefore, adoption of ingress filtering has not been widespread.

IP traceback has been proposed as an alternative to ingress filtering (see, e.g., S. Savage, D. Wetherall, A. Karlin and T. Anderson, "Practical Network Support for IP Traceback," *Proc. SIGCOMM'2000*, pp. 295-306, ACM, Stockholm, Sweden, August 2000). Unlike ingress filtering, IP traceback can be effective even if not widely deployed. IP traceback modifies routers so that they probabilistically send traceback information to a packet's destination. Statistical methods allow a victim to use such information to partly reconstruct the attack path (the reconstructed part is that closest to the victim). However, IP traceback has weaknesses that may affect the likelihood of it being adopted. In particular, traceback information sent by routers that are further from the victim than is the closest attacker can be spoofed and therefore needs authentication. The infrastructure necessary for such authentication may add considerable complexity and vulnerabilities of its own. Moreover, IP traceback may increase ISP responsibilities and costs without contributing to ISP revenues.

If universally adopted, ingress filtering, noted above as being recommended by the IETF, would protect against spoofing, such that the source address in each packet can be trusted to reveal the packet's origin. Since, however, ingress filtering in the near future is only going to be incrementally deployed in the network putting the trustworthiness of the source address of every packet in jeopardy, a methodology is needed that can take advantage of the protection that ingress filtering affords where it is provided, but which benefit it does afford is not negated by the fact that it has not yet been uniformly adopted by all ISPs that are connected to the Internet.

SUMMARY OF THE INVENTION

The present invention assumes Internet support for at least two separate classes of service, privileged and unprivileged, so as to limit the adverse effect of packets in the unprivileged class on the performance experienced by packets in the privileged class. In the current Internet, these multiple classes of service could be implemented using, for example, what has been designated as diffserv (see, e.g., S. Blake, D. Black, M. Carlson, E. Davies, Z. Wang and W. Weiss, "An Architecture for Differentiated Services," IETF, RFC 2475, December 1998). In accordance with the invention, those ISPs that do support ingress filtering will forward packets in a class of service that is privileged with respect to the class of service used to forward packets by ISPs that do not use ingress filtering. If an attack does occur in the higher privileged class of service, it can be traced back through its source address, which can be trusted because the source address of those packets have been authenticated at least in part by ingress filtering. The time to stop a congestive attack will be much less in this privileged class of service as compared that in the unprivileged class of service, where tracing the source of an attack may require installing filters in each router and logging to successively move further away from the victim towards the attacker. Advantageously, the entire Internet need not support two classes of service. The present invention can be used between any two ISPs connected by a route where differentiation of at least two classes of service is possible.

At an access or edge router in an ISP that supports two classes of service and ingress filtering, when a packet is received a determination is made whether the packet's source address is properly associated with the port on which the packet is received. If it is not properly associated, the packet is dropped. Otherwise, the packet is marked for forwarding in the privileged class of service. At an Internet exchange, packets are forwarded as follows: if a packet arrives from a first ISP that supports ingress filtering directed to a second ISP that also supports ingress filtering, then the Internet exchange forwards the packet to the second ISP in the same class of service as already marked; conversely, if a packet arrives from a first ISP that does not support ingress filtering directed to a second ISP that does support ingress filtering, then the Internet exchange forwards the packet to the second ISP in the unprivileged class of service.

In another embodiment, this methodology can be modified so that a packet is transported from its originating ISP in the privileged class of service only if the destination address of the packet is that of a subscribing site, such as a site that pays that ISP for performing the filtering service. A subscribing site might be desirous of paying or providing some other type of remuneration to an ISP for this service if it knows that many of the site's good customers enter the network through that ISP. The paid filtering ensures that those good customers are provided with better quality of service and availability. On the other hand, if a packet's destination address is not that of a subscribing site, the packet is forwarded in the unprivileged class of service.

Although the invention is described in connection with an embodiment in which the ISP's support or lack of support of ingress filtering is used to determine in which class of service a packet is transported, the invention is applicable to the enforcement of any type of predicate that a packet must have so that a server to which it is directed would be willing and able to accept it. Such a predicate might include, for example, only packets that have a valid source address, as is the predicate for ingress filtering; packets that conform to a certain protocol; packets that are addressed to a certain port; packets that do not exceed a certain transmission rate; and others predicate functions. Thus, if a packet obeys the desired predicate, it is transported in the privileged class of service, and if it does not, the packet is either dropped or segregated for transmission in the unprivileged class. Thus, packets that are not trusted to obey the predicate are precluded from consuming resources that otherwise would be used for a packet that is trusted to obey the predicate.

DETAILED DESCRIPTION

Figure 1:
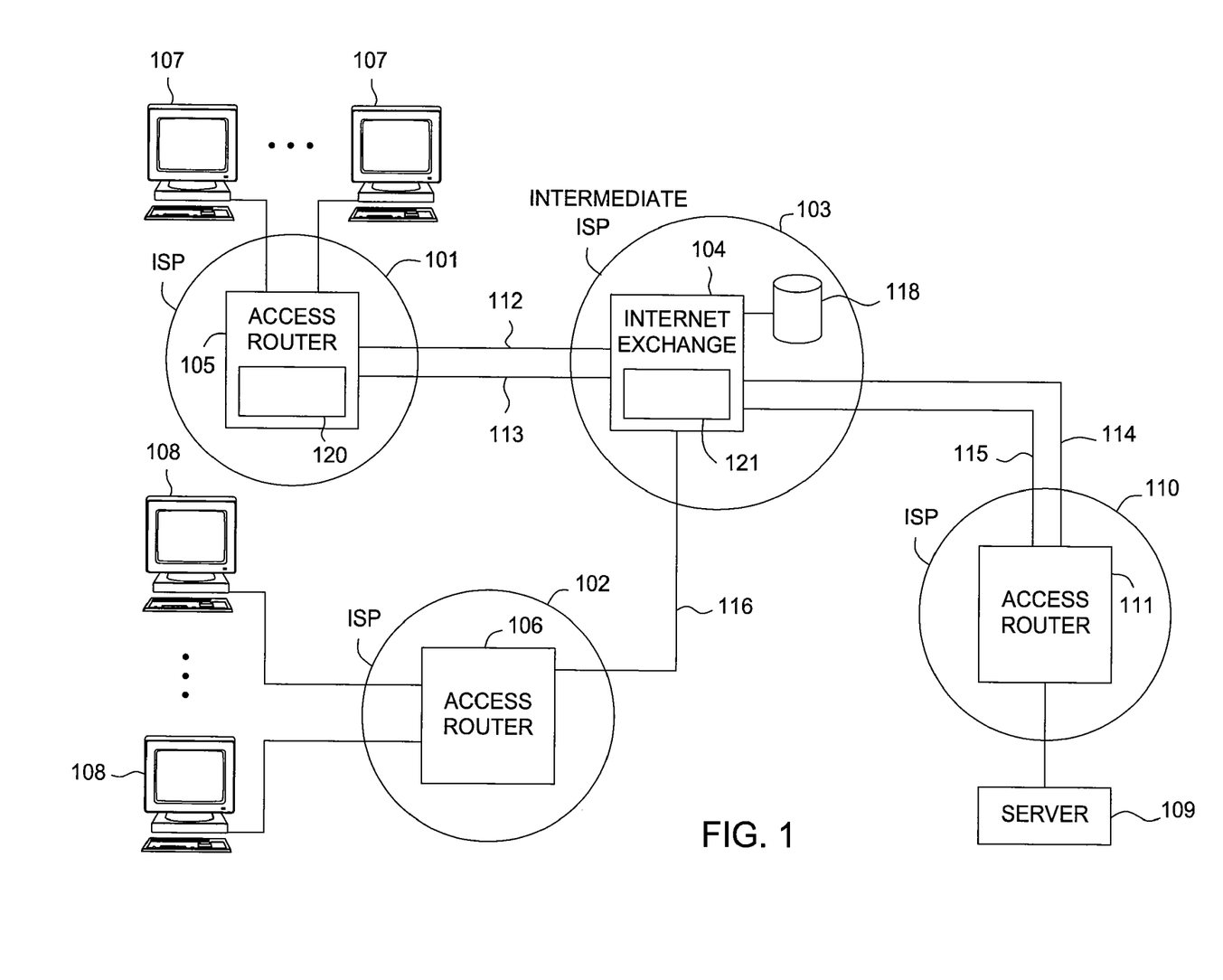
FIG. 1 is a block diagram of a system showing plural ISPs interconnected through an intermediate ISP that comprises an Internet exchange router, wherein one of the ISPs does not support ingress filtering while the others do.

With reference to FIG. 1, ISP 101, which supports ingress filtering, and ISP 102, which does not support ingress filtering, are connected to an intermediate ISP 103. Intermediate ISP 103 comprises an Internet exchange router 104 at which two or more ISPs exchange packets. ISP 101 includes one or more access or edge routers 105, and ISP 102 includes one or more access or edge routers 106. A plurality of clients 107 are connected to ISP 101 over a telecommunications network (not shown) such as a local POTS network or a DSL connection, a cable network using a cable modem, or any other network or methodology, wired or wireless, which provides Internet connectivity to the clients. Similarly, a plurality of clients 108 are connected to ISP 102 via a wired or wireless connection. A server 109 is connected to ISP 110, which is connected through an access or edge router 111 to intermediate ISP 103 and Internet exchange 104. By way of example, two classes of service, privileged and unprivileged, are available to packets sent from and sent to ISP 101. To illustrate that separate resources are available to these separate classes of services, ISP 101 and intermediate ISP 103 are shown interconnected by two connections 112 and 113, for the separate transmission of packets in the privileged and unprivileged classes of service, respectively. Similarly, ISP 110 has the two classes of service, privileged and unprivileged, available to it for the transmission of packets, which are transmitted over the connections 114 and 115, respectively. ISP 102, which does not support ingress filtering, has only a single unprivileged class of service available to it, and is thus shown connected to intermediate ISP 103 via a single connection 116 over which data packets in that unprivileged class are transmitted.

The access or edge router 105 in ISP 101, which supports ingress filtering and the at least two classes of service runs, in addition to its routing programs, an application or a program 120 to perform the ingress filtering functions and in the same or separate application or program, the functions of forwarding packets in a privileged or unprivileged class of service. Similarly, the Internet exchange 104 router within intermediate ISP 103, runs an application or program 121 to forward packets it receives from those ISPs that do support ingress filtering and two classes of service in a privileged class of service if received in that class; and to forward packets it receives from those ISPs that do not support ingress filtering in an unprivileged class of service.

Figure 2:
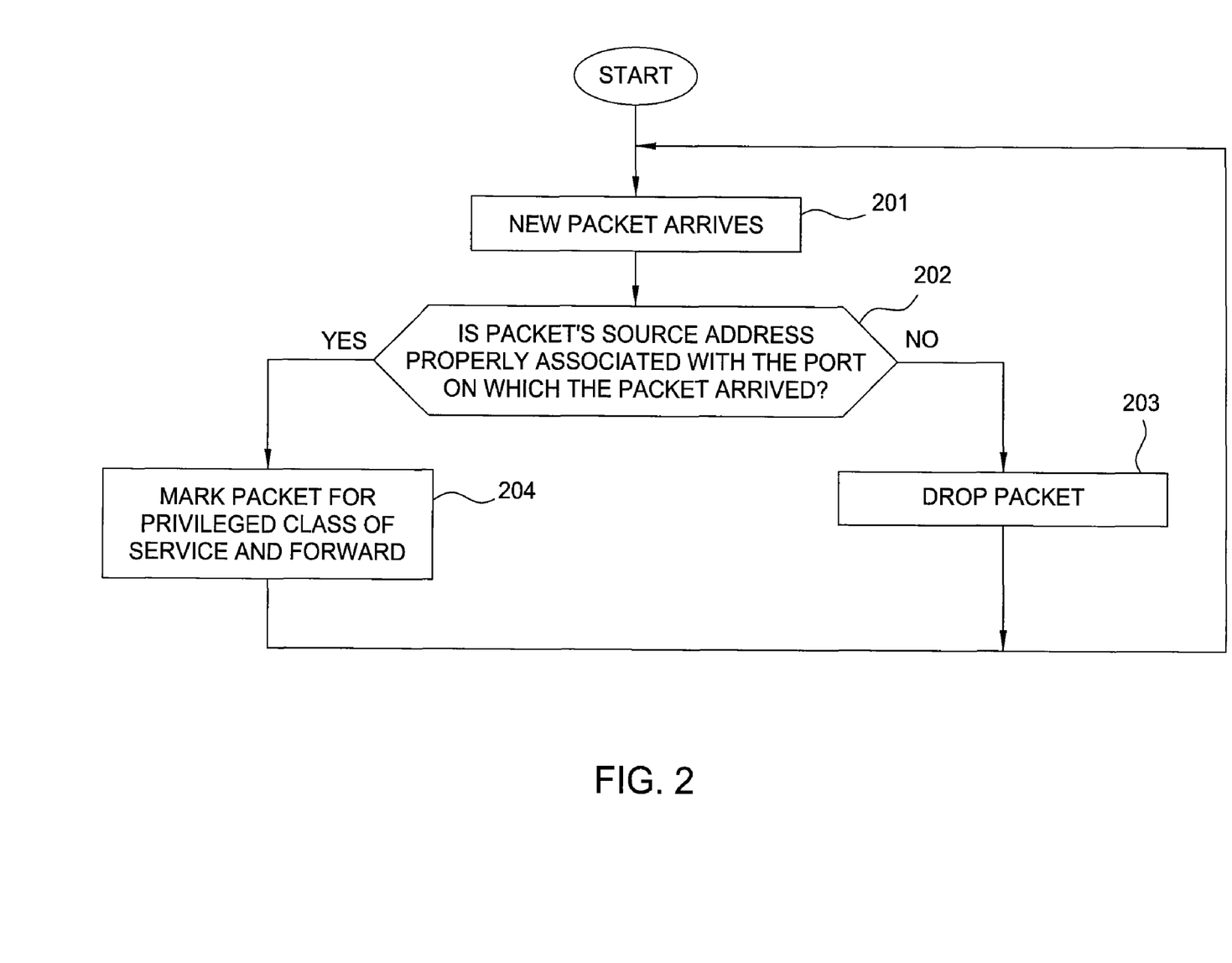
FIG. 2 is a flowchart showing the steps at an ISP, in accordance with an embodiment of the invention.

The flowchart in FIG. 2 show the functions that application or program 120 performs at access or edge router 105 at ISP 101 that supports ingress filtering and which has two classes of service available to it. At step 201, a new packet is received from one of the clients 107 of ISP 101 having a destination address of a server, such as server 109, which is connected to the Internet through its ISP 110. At step 202, a determination is made whether the source address of that packet is properly associated with the port on which the packet was received, i.e., whether the source address of the packet is within one of the ranges associated with the port on which the packet was received at the ISP. If it is not, then the source address is invalid and, at step 203, the packet is filtered and precluded from entering the network and is thus dropped. If the packet's source address is properly associated with the port on which the packet arrived, then the packet is not filtered and it is assumed not to be spoofed. The packet, at step 204, is then marked for transmission in a privileged class of service and forwarded in the privileged class of service by the ISP to an intermediate ISP 103 for transfer to the ISP 110 that serves the host server 109 to which the packet is addressed. The program or application continues to process each packet serially or in parallel as it arrives from any of the clients 107.

Figure 3:
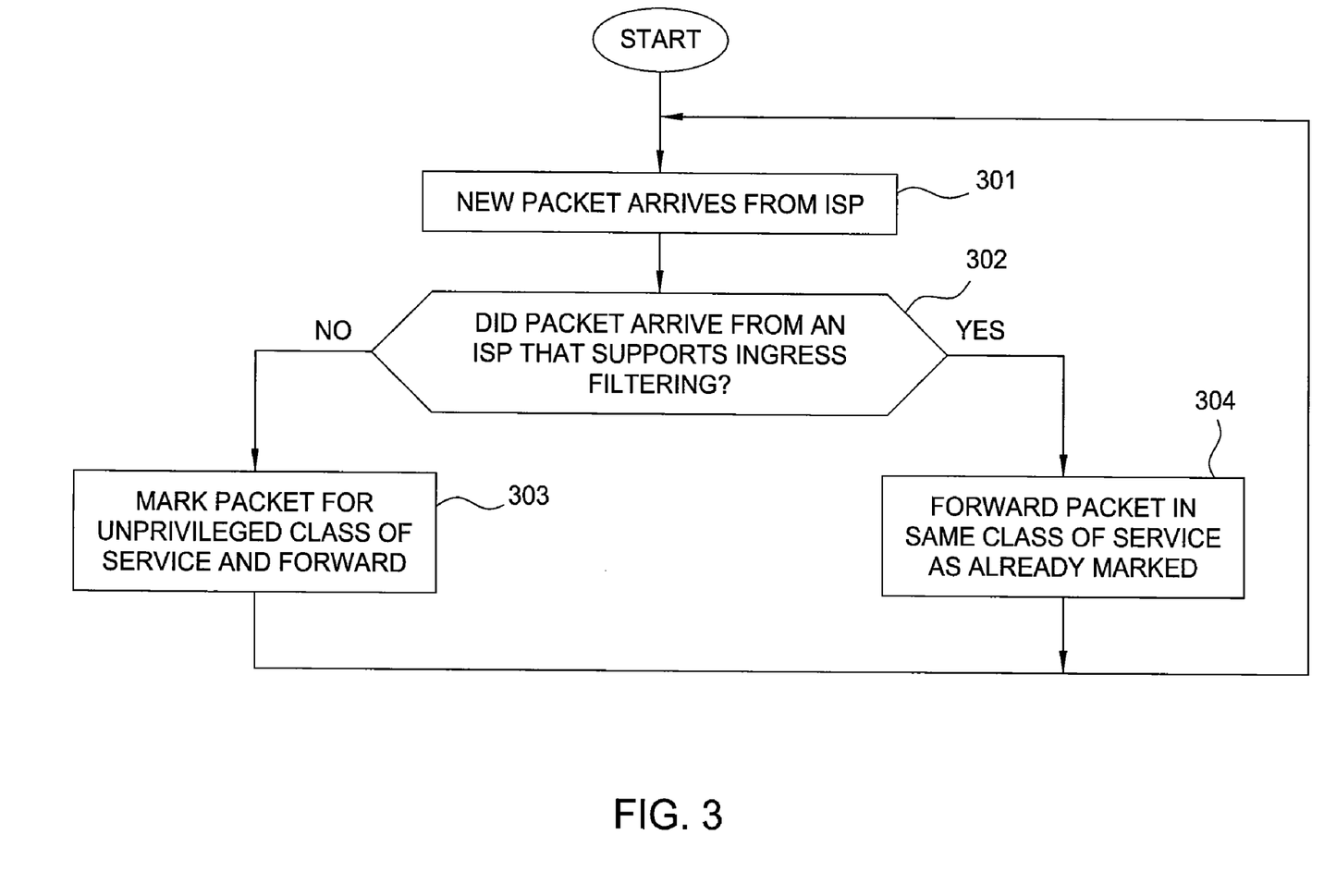
FIG. 3 is flowchart showing the steps at the Internet exchange router, in accordance with an embodiment of the invention.

The flowchart in FIG. 3 shows the functions that the application or program 121 performs at Internet exchange router 104. It is assumed that Internet exchange router 104 has available, in an associated memory 118, for example, the identity of all the ISPs for which it exchanges packets that support ingress filtering. At step 301, a new packet arrives from one of the ISPs for which it exchanges packets. At step 302, a determination is made whether that packet has arrived from an ISP that does supports ingress filtering. If that source ISP does not support ingress filtering, then, at step 303, that packet is marked for transmission to its destination in an unprivileged class of service and is forwarded. Thus, if a packet addressed to the host server 109 arrives from ISP 102, which does not support ingress filtering, that packet is forwarded by Internet exchange 104 router to ISP 110 using the unprivileged class of service transmission facilities 115. If, however, at step 302, it is determined that the arriving packet came from an ISP that does support ingress filtering, such as ISP 101, then, at step 304, that packet is forwarded to its destination ISP in the same class in which it is already marked. Thus, if a packet addressed to server 109 arrives at Internet exchange 104 from ISP 101 marked in a privileged class of service, then that packet is forwarded to access or edge router 111 within ISP 110 using the privileged class of service transmission facilities 114. As will be seen in the embodiment described below, a packet may arrive marked in an unprivileged class of service rather than a privileged class of service from an origin ISP that does support ingress filtering. Internet exchange 104 thus forwards an arriving packet to its destination ISP using the same class of service in which it was received.

The added expense incurred by the ISP to modify its access and edge routers to perform the additional functions of ingress filtering and to maintain same, inures to the benefit not the ISP but rather the proprietors of the destination servers which obtain relief from congestive denial of service attacks. Thus, an ISP which needs to perform these added-cost functions, may elect to perform ingress filtering for only packets that are destined to some select host servers that have made some arrangement with the ISP, financial or otherwise, to perform these functions. A server, for example, may be willing to pay or provide some other type of remuneration to an ISP through which its best customers are known to access the Internet for the value-added service of ingress filtering and the transmission of trusted packets to it in a privileged class of service. Those best customers, transmitting their packets in the privileged class of service, will thus be less likely to be subject to the effects of a denial of service attack, which is most likely to affect transmissions made over the unprivileged class of service where the source address of arriving packets is less trustworthy.

Figure 4:
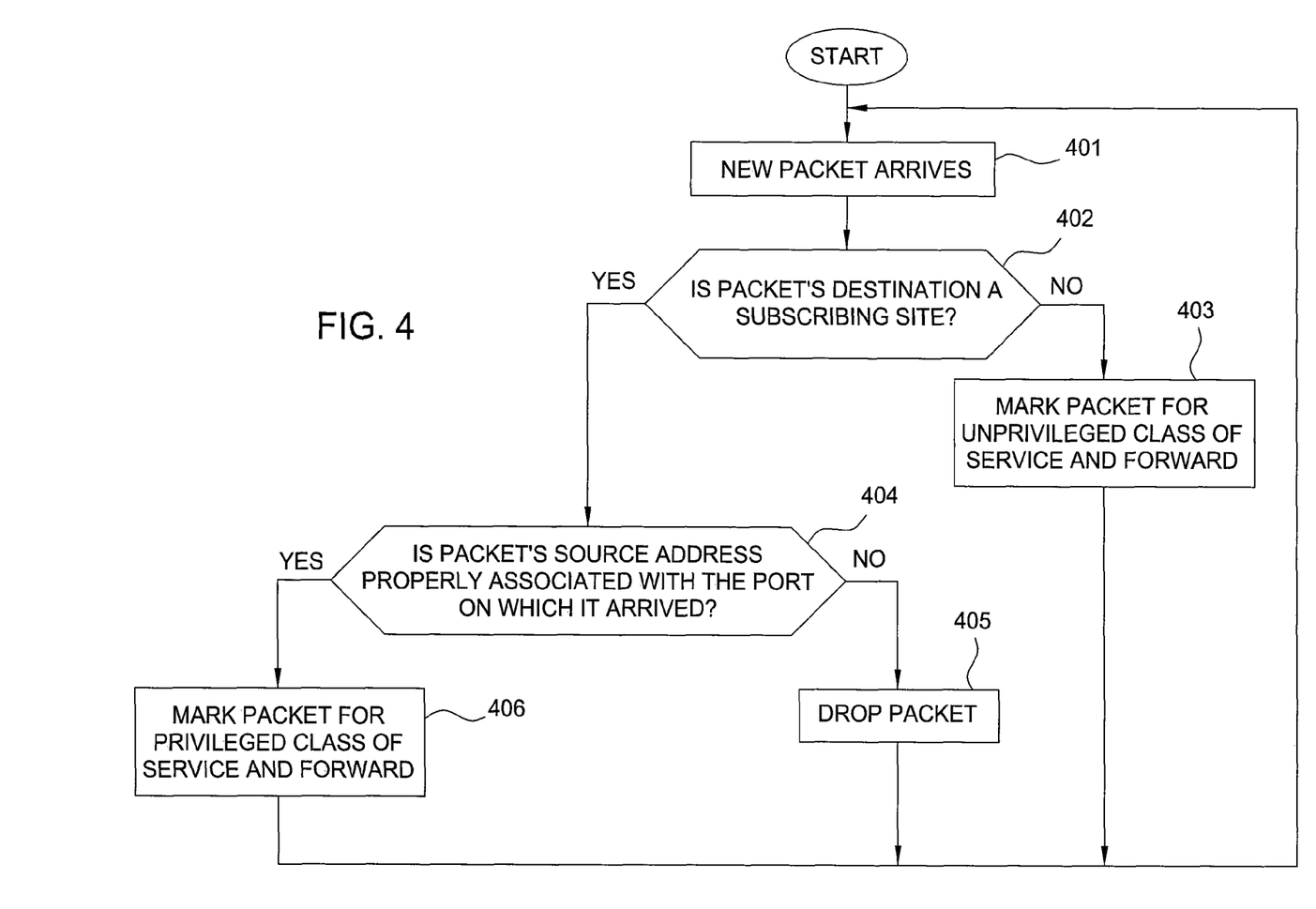
FIG. 4 is a flowchart showing the steps at an ISP, in accordance with a second embodiment of the invention.

The flowchart in FIG. 4 shows the functions that the application or program 120 performs at access or edge router 105 within an ISP 101 that supports ingress filtering and multiple classes of service for an embodiment in which ingress filtering and the privileged class are service are imposed only on packets which are destined to predetermined host servers that have established an arrangement with the ISP. That arrangement may be financial in which a host server remunerates the ISP in some manner for performing the services. At step 401, a new packet is received at the access or edge router. At step 402, a determination is made whether the destination address of that packet is a subscribing site, i.e., one that has made an arrangement financial or otherwise with the ISP. If it is not, that packet is marked for an unprivileged class of service and is forwarded to the intermediate ISP for transmission onward in the unprivileged class to the ISP associated with its destination address. If the packet's destination is a subscribing site, then, at step 404, ingress filtering is performed to determine whether the packet's source address is properly associated with the port on which the packet was received. If it is not properly associated, then, at step 405, the packet is dropped. If it is properly associated, then, at step 406, the packet is marked for transmission in the privileged class of service and is forwarded to the intermediate ISP in that privileged class of service for transmission to the destination host server. Although ingress filtering is shown in FIG. 4 as being performed after a determination is made, at step 402, whether the packet destination is a subscribing site, ingress filtering could alternatively be performed before that determination is made. In that case, if the packet's source address is not properly associated with the port on which the packet was received, it is dropped rather than being transmitted in the lower class of service. A filtered packet is then marked for transmission with a higher or lower class of service according to whether its destination address is or is not a subscribing site, respectively.

The embodiments described above use the function of ingress filtering (i.e., determining whether a packet's source address is properly associated with the port on which it arrives) to determine whether a network should accept a packet. In a more general sense, it is possible to define any other predicate P that a packet must obey to be accepted by the network and the host servers on the network. P might include, for example, only packets that have a valid source address (as per ingress filtering described above), packets that conform to a certain protocol, packets that are addressed to a certain port, packets that do not exceed a certain transmission rate, etc.

For a description of this more general scheme, F is defined as a set of networks that deploy the scheme and trust each other's deployment of the scheme, and G is defined as the remaining networks that do not. The more general scheme is described as follows: (1) When a network N1 in F receives a packet K from another network N2 also in F, N1 forwards the packet K in the same class of service as did N2; (2) When a network N1 in F receives a packet L from another network M in G, N1 may: (a) forward the packet L in an unprivileged class of service; or (b) if L obeys the predicate P, forward L in a privileged class, otherwise drop L or forward it in the unprivileged class. These rules drop or segregate in the unprivileged class packets that do not or may not obey the desired predicate P. Thus, packets that are not trusted to obey P cannot consume resources that otherwise would be used for a packet that is trusted to obey P. These properties hold even if one or more networks do not deploy the scheme.

As in the earlier described embodiments in which P is ingress filtering, the more general scheme can be extended so that the predicate P is valid only for packets destined to some set of hosts H, and even more specifically, to where H remunerates the network F for enforcing predicate P according to the rules of the scheme. Further, the hosts H may remunerate the network N1 for performing filtering according to rule (2)(b) above.

As previously noted, the present invention is likely to be implemented as a computer program or application running in the periphery of the Internet, most probably in an access or edge router. It may also be implemented, in part, in a computer program or application running at an Internet exchange router in an intermediate ISP where two networks exchange packets.

It should be noted that the term privileged class of service as used herein and in the claims encompasses any method that limits the adverse effects of packets sent in the unprivileged class of service on the performance of the packets being sent in the privileged class of service.

The foregoing merely illustrates the principles of the invention. It will thus be appreciated that those skilled in the art will be able to devise various arrangements, which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It will be further appreciated by those skilled in the art that the block diagrams herein represent conceptual views embodying the principles of the invention. Similarly, it will be appreciated that the flowchart represents various processes that may be substantially represented in computer readable medium and so executed by a computer or processor, whether or not such computer or processor is explicitly shown.

The invention claimed is:

1. A method for processing a packet at a router of a first Internet Service Provider (ISP) network, comprising:
    determining whether a source address of the received packet is properly associated with a port on which the packet is received, wherein determining is based upon whether the source address of the received packet is within a valid range associated with the port on which the packet is received;
    when the source address of the received packet is determined to not be properly associated with the port on which the packet is received, marking the packet for forwarding in an unprivileged class of service; and
    when the source address of the received packet is determined to be properly associated with the port on which the packet is received, determining whether a destination address of the received packet is one of a predetermined one or more addresses;
        wherein the packet is marked for forwarding in a privileged class of service when the destination address of the received packet is one of the predetermined one or more addresses;
        wherein the packet is marked for forwarding in an unprivileged class of service when the destination address of the received packet is not one of the predetermined one or more addresses.

2. The method of claim 1, wherein at least one of the predetermined one or more addresses is associated with a host server site, and wherein the host server site remunerates the first ISP for performing the method.

3. The method of claim 1, wherein:
    when the packet is received at the first ISP from a second ISP that does not support ingress filtering, the received packet is dropped when the source address of the received packet is determined to not be properly associated with the port on which the packet is received; and
    when the packet is received at the first ISP from a second ISP that does support ingress filtering, the received packet is marked for forwarding in the unprivileged class of service when the source address of the received packet is determined to not be properly associated with the port on which the packet is received.

4. A router of a first Internet Service Provider (ISP) network, comprising:
    at least one processor configured for:
    determining whether a source address of the received packet is properly associated with a port on which the packet is received, wherein determining is based upon whether the source address of the received packet is within a valid range associated with the port on which the packet is received;

when the source address of the received packet is determined to not be properly associated with the port on which the packet is received, marking the packet for forwarding in an unprivileged class of service; and when the source address of the received packet is determined to be properly associated with the port on which the packet is received, determining whether a destination address of the received packet is one of a predetermined one or more addresses;

wherein the packet is marked for forwarding in a privileged class of service when the destination address of the received packet is one of the predetermined one or more addresses;

wherein the packet is marked for forwarding in an unprivileged class of service when the destination address of the received packet is not one of the predetermined one or more addresses.

5. The router of claim 4, wherein the router is an access or edge router in the first Internet Service Provider (ISP) network and at least one of the predetermined one or more addresses is associated with a server site, and wherein the server site remunerates the ISP.

6. A method for processing a packet at an Internet exchange router configured for communication with a first Internet Service Provider (ISP) network and a second Internet Service Provider (ISP) network, comprising:

using at least one processor to perform the steps of:

receiving, from a router of the first ISP network, a packet intended for a destination served by the second ISP network;

determining whether the first ISP network supports ingress filtering, wherein ingress filtering comprises determining whether a received packet is properly associated with a port on which the Packet is received based upon whether the source address of the received packet is within a valid range associated with the port on which the packet is received; and if the first ISP network supports ingress filtering, marking the received packet for forwarding in the same privileged class of service or unprivileged class of service in which the packet is received and forwarding the received packet toward the second ISP network using the marked class of service; or if the first ISP network does not support ingress filtering, marking the received packet for forwarding in an unprivileged class of service, and forwarding the received packet toward the second ISP network using the marked class of service.

7. A method for processing a packet at a router of an Internet Service Provider (ISP) network, comprising:

using at least one processor to perform the steps of:

receiving a packet having a destination address;

determining whether the destination address of the received packet is associated with a subscribing site; and if the destination address of the received packet is not associated with a subscribing site, marking the received packet for forwarding in an unprivileged class of service; or if the destination address of the received packet is associated with a subscribing site and the source address of the received packet is determined to be properly associated with the port on which the packet is received, marking the received packet for forwarding in a privileged class of service, wherein determining whether the received packet is properly associated with the port on which the packet is received is based upon whether the source address of the received packet is within a valid range associated with the port on which the packet is received.

* * * * *